US012581376B2

(12) United States Patent
Xie et al.

(10) Patent No.: US 12,581,376 B2
(45) Date of Patent: Mar. 17, 2026

(54) INFORMATION REPORTING METHOD, INFORMATION RECEIVING METHOD, TERMINAL AND NETWORK DEVICE

(71) Applicants: China Mobile Communication Co., Ltd Research Institute, Beijing (CN); China Mobile Communications Group Co.,Ltd., Beijing (CN)

(72) Inventors: Fang Xie, Beijing (CN); Guangyi Liu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 404 days.

(21) Appl. No.: 17/776,351

(22) PCT Filed: Oct. 30, 2020

(86) PCT No.: PCT/CN2020/125093
§ 371 (c)(1),
(2) Date: May 12, 2022

(87) PCT Pub. No.: WO2021/093602
PCT Pub. Date: May 20, 2021

(65) Prior Publication Data
US 2022/0400415 A1 Dec. 15, 2022

(30) Foreign Application Priority Data

Nov. 15, 2019 (CN) .......................... 201911118118.3

(51) Int. Cl.
H04W 72/04 (2023.01)
H04W 36/00 (2009.01)
(Continued)

(52) U.S. Cl.
CPC ..... H04W 36/0079 (2018.08); H04W 36/185 (2023.05); H04W 36/305 (2018.08); *H04W 36/362* (2023.05)

(58) Field of Classification Search
CPC ........... H04W 36/0079; H04W 36/185; H04W 36/305; H04W 36/362
See application file for complete search history.

(56) References Cited

U.S. PATENT DOCUMENTS 12,177,652 B2 * 12/2024 Ishii .................... H04W 36/362
2012/0257510 A1 10/2012 Jeong et al.
(Continued)

FOREIGN PATENT DOCUMENTS

CN 102281633 A 12/2011
CN 104054388 A 9/2014
(Continued)

OTHER PUBLICATIONS

Vivo, R2-1912349, Summary of Email Discussion on CP for DAPS, 3GPP TSG-RAN WG2 Meeting #107bis, Chongqing, China, Oct. 14-18, 2019 (Year: 2019).*
(Continued)

*Primary Examiner* — Mahbubul Bar Chowdhury
(74) *Attorney, Agent, or Firm* — Price Heneveld LLP

(57) ABSTRACT

Embodiments of the disclosure provide an information reporting method, an information receiving method, a terminal and a network device. The information reporting method includes: reporting, to a network device, information of a connection failure or a secondary cell addition failure, wherein the connection failure includes at least one of the following: a conditional handover failure, a reduction in user data interruption (RUDI) failure and a dual active protocol stack (DAPS) failure.

8 Claims, 3 Drawing Sheets reporting, to a network device, information of a connection failure or a secondary cell addition failure, wherein the connection failure includes at least one of the following: a conditional handover failure, a reduction in user data interruption (RUDI) failure and a dual active protocol stack (DAPS) failure

11

(51) Int. Cl.
    *H04W 36/18*    (2009.01)
    *H04W 36/30*    (2009.01)
    *H04W 36/36*    (2009.01)

(56)                References Cited

U.S. PATENT DOCUMENTS

| 2016/0316508 | A1  | 10/2016 | Hong et al. |
| 2016/0338136 | A1  | 11/2016 | Zhang et al. |
| 2017/0223763 | A1  | 8/2017  | Rahman et al. |
| 2020/0015142 | A1  | 1/2020  | Jia et al. |
| 2020/0045602 | A1* | 2/2020  | Jiang .................... H04B 17/318 |
| 2020/0351734 | A1* | 11/2020 | Purkayastha ..... H04W 74/0833 |
| 2021/0029600 | A1* | 1/2021  | Balan ................ H04W 36/0094 |
| 2021/0144610 | A1* | 5/2021  | Xu ......................... H04W 36/08 |
| 2021/0243660 | A1  | 8/2021  | Xie et al. |
| 2022/0014987 | A1* | 1/2022  | Fujishiro ......... H04W 36/00837 |
| 2022/0141735 | A1* | 5/2022  | Liu ..................... H04W 36/305 |
|              |     |         | 370/331 |
| 2022/0159530 | A1* | 5/2022  | Kim .................... H04W 36/362 |
| 2022/0201582 | A1* | 6/2022  | Eklöf et al. .......... H04W 24/08 |
| 2022/0264414 | A1* | 8/2022  | Hu ........................ H04W 76/20 |
| 2022/0272585 | A1* | 8/2022  | Chen ................. H04W 36/0079 |
| 2022/0286935 | A1* | 9/2022  | Fang ................ H04W 74/0833 |
| 2022/0369171 | A1* | 11/2022 | Kim ..................... H04W 36/08 |
| 2022/0377602 | A1* | 11/2022 | Kim ..................... H04W 28/12 |
| 2022/0386204 | A1* | 12/2022 | Parichehrehteroujeni ................... |
|              |     |         | H04W 76/19 |
| 2023/0030653 | A1* | 2/2023  | Hori ................. H04W 36/0079 |

FOREIGN PATENT DOCUMENTS

| CN | 105103616 A | 11/2015 |
| CN | 105264939 A | 1/2016 |
| CN | 105376786 A | 3/2016 |
| CN | 106851722 A | 6/2017 |
| CN | 107006051 A | 8/2017 |
| CN | 107483161 A | 12/2017 |
| CN | 109391399 A | 2/2019 |
| CN | 110351791 A | 10/2019 |
| CN | 110366212 A | 10/2019 |
| CN | 110402592 A | 11/2019 |
| CN | 110446232 A | 11/2019 |
| JP | 2017505057 A | 2/2017 |
| WO | 2018057076 A1 | 3/2018 |
| WO | 2019184621 A1 | 10/2019 |

OTHER PUBLICATIONS

Samsung, (TP for SON BL CR for TS 38.300): MRO, 3GPP TSG-RAN WG3 #106, R3-197139, Nov. 18-22, 2019, Reno, NV, USA.

Nokia et al., "On RLF reporting for CHO and DAPS", 3GPP TSG-RAN WG2 Meeting #108, R2-1915497, Reno, USA, Nov. 18-22, 2019.

Vivo, "Summary of Email Discussion on CP for DAPS", 3GPP TSG-RAN WG2 Meeting #107bis, R2-1912349, Chongqing, China, Oct. 14-18, 2019.

CATT, "Remaining CP Issues of DAPS ", 3GPP TSG RAN WG2 Meeting #108, R2-1914485, Reno, NV, USA, Nov. 18-22, 2019.

Huawei et al., "Problems of ROHC handling for DAPS", 3GPP TSG-RAN WG2 #107bis, R2-1913206, Chongqing, China, Oct. 14-18, 2019.

Ericsson, "Control plane handling during the RUDI handover procedure", 3GPP TSG-RAN WG2 #107bis, Tdoc R2-1912358, Chongqing, China, Oct. 10-14, 2019.

* cited by examiner reporting, to a network device, information of a connection failure or a secondary cell
addition failure, wherein the connection failure includes at least one of the following:
a conditional handover failure, a reduction in user data interruption (RUDI) failure
and a dual active protocol stack (DAPS) failure

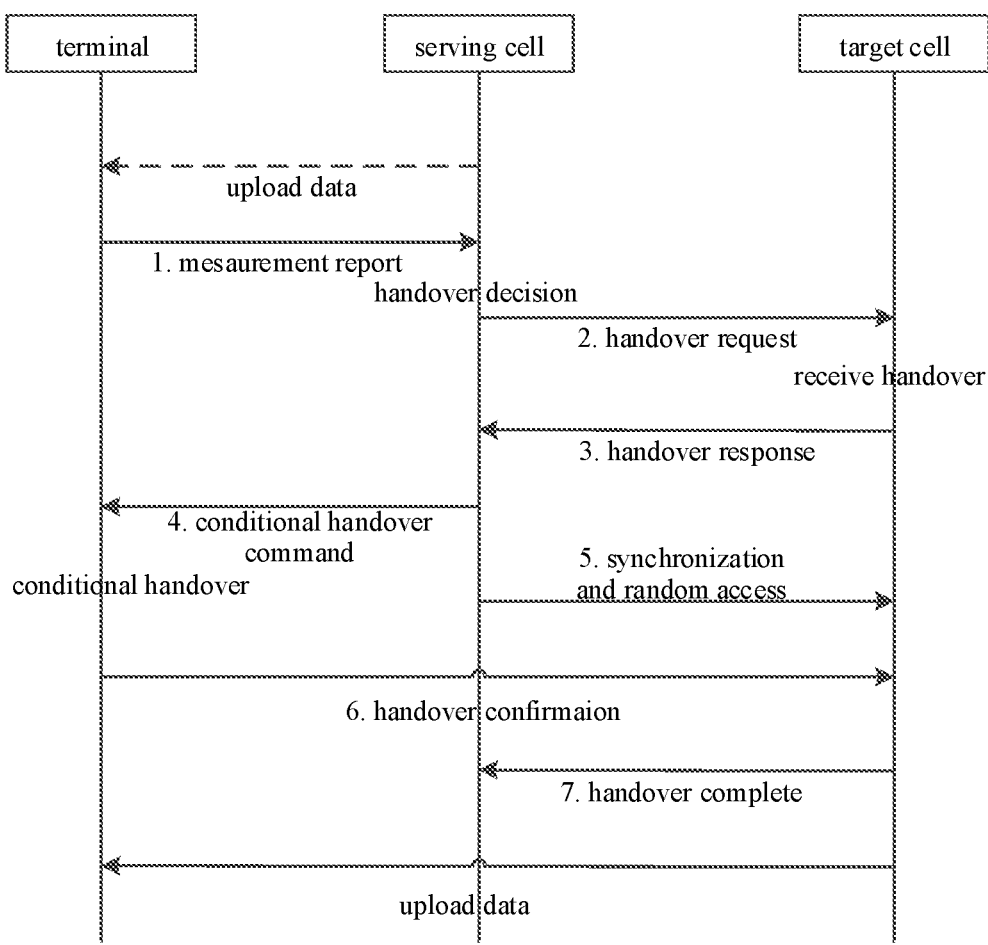

Fig. 2 receiving information of a connection failure or a secondary cell addition failure, the
information of the connection failure or the secondary cell addition failure being
reported by a terminal, wherein the connection failure includes at least one of the
following: a conditional handover failure, a reduction in user data interruption
(RUDI) failure and a dual active protocol stack (DAPS) failure

INFORMATION REPORTING METHOD, INFORMATION RECEIVING METHOD, TERMINAL AND NETWORK DEVICE

CROSS-REFERENCE TO RELATED APPLICATION

The present application is a U.S. national phase application of a PCT Application No. PCT/CN2020/125093 filed on Oct. 30, 2020, which claims a priority to the Chinese patent application No. 201911118118.3 filed in China on Nov. 15, 2019, disclosures of which are incorporated herein by reference in their entireties.

TECHNICAL FIELD

The present disclosure relates to the field of communication technologies, in particular to an information reporting method, an information receiving method, a terminal and a network device.

BACKGROUND

Conditional handover is a mechanism for enhancing the robustness of handover, and similarly, conditional secondary cell addition is a mechanism for enhancing the robustness of secondary cell addition. In order to solve the problem that a channel between UE (user equipment or terminal) and a serving cell deteriorates suddenly (especially at high frequencies), thereby preventing the UE from completing the handover or the secondary cell addition process properly, the base station can configure the UE to trigger measurement reporting at a lower threshold, carry a higher threshold for triggering handover in the Hand Over (HO) command or the secondary cell addition command, and the HO command or the secondary cell addition command can also carry random access resources used by the UE in the target cell; once a handover or secondary cell addition threshold is satisfied, the UE initiates a random access procedure to a target base station or cell. A source base station or source cell may configure the UE with conditional handover to multiple target cells.

Dual active protocol stack (DAPS) is a mechanism for reduction in user data interruption (RUDI) during handover process. During the handover process, the UE can perform data transmission with the target cell and the source cell simultaneously or in a time-divided manner.

In practical applications, the source base station or source cell can configure the UE to work under the conditional handover or DAPS/RUDI mechanism, or work under both mechanisms at the same time. When the UE is in the process of handover or secondary node/secondary cell addition, the conditional handover and/or DAPS/RUDI mechanism of the terminal may fail due to improper related network side configuration parameters, such as handover event, handover threshold, or configuration time.

SUMMARY

The present disclosure provides an information reporting method, an information receiving method, a terminal and a network device. It can help the network side to perform configuration properly according to information reported by the terminal.

In order to solve the above-mentioned technical problem, embodiments of the present disclosure provide the following solutions.

An information reporting method, applied to a terminal, including:

reporting, to a network device, information of a connection failure or a secondary cell addition failure, wherein the connection failure includes at least one of the following: a reduction in user data interruption (RUDI) failure and a dual active protocol stack (DAPS) failure.

Optionally, the information includes at least one of the following:

information of a conditional handover;

a connection failure type; or information of a failure related time difference.

Optionally, the connection failure further includes: a conditional handover failure;

the information of the conditional handover includes at least one of the following:

the conditional handover failure occurs;

the conditional handover failure occurs for the first time;

the conditional handover failure occurs once;

the conditional handover failure occurs after a re-establishment or a cell selection;

a second conditional handover fails after the re-establishment or the cell selection;

the second conditional handover fails; or the conditional handover failure occurs twice.

Optionally, the connection failure type includes at least one of the following:

RUDI or DAPS fails;

the terminal falls back to normal handover after the RUDI or DAPS fails;

radio link failure (RLF) occurs once and conditional handover (CHO) failure occurs once;

handover failure occurs once and conditional handover failure occurs once;

the conditional handover failure occurs twice; or both the conditional handover and the RUDI/DAPS fail.

Optionally, the information of the failure related time difference includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

Optionally, the information reporting method further includes: reporting measurement information of a cell measured until the connection failure occurs, wherein the cell includes at least one of the following: a source cell, a target cell where the terminal handover fails, and a candidate target cell configured on a network side.

Optionally, the measurement information includes at least one of the following: a cell identifier; a cell measurement result; a beam ID measured by the terminal; a beam measurement result; or a quantity of beams whose beam quality exceeds a preconfigured threshold in the cell measured by the terminal.

Optionally, the information reporting method further includes: reporting a handover event and/or threshold information related to the conditional handover failure.

Optionally, the network device is one of the following: a source base station or a source cell; a new base station or a new cell to which the terminal is connected; or a target base station or a target cell to which the terminal is handed over.

Optionally, the terminal reports the connection failure information to the network device through one of the following information:

a re-establishment request message; a radio link failure (RLF) report; minimized drive test information; or a re-establishment reason message.

An embodiment of the present disclosure further provides an information receiving method, which is applied to a network device. The method includes: receiving, from a terminal, information of a connection failure or a secondary cell addition failure, wherein the connection failure includes at least one of the following: a reduction in user data interruption (RUDI) failure and a dual active protocol stack (DAPS) failure.

Optionally, the information includes at least one of the following:

information of a conditional handover; a connection failure type; or information of a failure related time difference.

Optionally, the connection failure further includes: a conditional handover failure;

the information of the conditional handover includes at least one of the following:

the conditional handover failure occurs; the conditional handover failure occurs for the first time; the conditional handover failure occurs once; the conditional handover failure occurs after a re-establishment or a cell selection; a second conditional handover fails after the re-establishment or the cell selection; the second conditional handover fails; or the conditional handover failure occurs twice.

Optionally, the connection failure type includes at least one of the following:

RUDI or DAPS fails;

the terminal falls back to a normal handover after the RUDI or DAPS fails;

radio link failure (RLF) occurs once and conditional handover (CHO) failure occurs once;

handover failure occurs once and conditional handover failure occurs once;

the conditional handover failure occurs twice; or both the conditional handover and the RUDI/DAPS fail.

Optionally, the information of the failure related time difference includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

Optionally, the information receiving method further includes: receiving, from the terminal, measurement information of a cell measured until the connection failure occurs, wherein the cell includes at least one of the following: a source cell, a target cell where the terminal handover fails, and a candidate target cell configured on the network side.

Optionally, the measurement information includes at least one of the following: a cell identifier; a cell measurement result; a beam ID measured by the terminal; a beam measurement result; or a quantity of beams whose beam quality exceeds a preconfigured threshold in a cell measured by the terminal.

Optionally, the information receiving method further includes: receiving a handover event and/or threshold information related to the condition handover failure.

Optionally, the network device is one of the following: a source base station or a source cell; a new base station or a new cell to which the terminal is connected; and a target base station or a target cell to which the terminal is handed over.

Optionally, the connection failure information reported by the terminal is received through one of the following information: a re-establishment request message; a radio link failure (RLF) report; minimized drive test information; or a re-establishment reason message.

An embodiment of the present disclosure further provides a terminal, including:

a transceiver, configured to report, to a network device, information of a connection failure or a secondary cell addition failure, wherein the connection failure includes at least one of the following: a reduction in user data interruption (RUDI) failure and a dual active protocol stack (DAPS) failure.

Optionally, the information includes at least one of the following:

information of a conditional handover;

a connection failure type; or information of a failure related time difference.

Optionally, the connection failure further includes: a conditional handover failure;

the information of the conditional handover includes at least one of the following:

the conditional handover failure occurs;

the conditional handover failure occurs for the first time;

the conditional handover failure occurs once;

the conditional handover failure occurs after a re-establishment or a cell selection;

a second conditional handover fails after the re-establishment or the cell selection;

the second conditional handover fails; or the conditional handover failure occurs twice.

Optionally, the connection failure type includes at least one of the following:

RUDI or DAPS fails;

the terminal falls back to normal handover after the RUDI or DAPS fails;

radio link failure (RLF) occurs once and conditional handover (CHO) failure occurs once;

handover failure occurs once and conditional handover failure occurs once;

the conditional handover failure occurs twice; or both the conditional handover and the RUDI/DAPS fail.

Optionally, the information of the failure related time difference includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

Optionally, the information reporting method further includes: reporting measurement information of a cell measured until the connection failure occurs, wherein the cell includes at least one of the following: a source cell, a target cell where the terminal handover fails, and a candidate target cell configured on the network device.

Optionally, the measurement information includes at least one of the following: a cell identifier; a cell measurement result; a beam ID measured by the terminal; a beam measurement result; or a quantity of beams whose beam quality exceeds a preconfigured threshold in the cell measured by the terminal.

Optionally, the information reporting method further includes: reporting a handover event and/or threshold information related to the conditional handover failure.

Optionally, the network device is one of the following: a source base station or a source cell; a new base station or a new cell to which the terminal is connected; or a target base station or a target cell to which the terminal is handed over.

Optionally, the terminal reports the connection failure information to the network device through one of the following information:

a re-establishment request message; a radio link failure (RLF) report; minimized drive test information; or a re-establishment reason message.

An embodiment of the present disclosure further provides an information reporting apparatus, which is applied to a terminal, and the apparatus includes:

a transceiver module, configured to report, to a network device, information of a connection failure or a secondary cell addition failure, wherein the connection failure includes at least one of the following: a reduction in user data interruption (RUDI) failure and a dual active protocol stack (DAPS) failure.

Optionally, the information includes at least one of the following:

information of a conditional handover;

a connection failure type;

information of a failure related time difference.

Optionally, the connection failure further includes: a conditional handover failure;

the information of the conditional handover includes at least one of the following:

the conditional handover failure occurs;

the conditional handover failure occurs for the first time;

the conditional handover failure occurs once;

the conditional handover failure occurs after a re-establishment or a cell selection;

the second conditional handover fails after the re-establishment or the cell selection;

the second conditional handover fails; or the conditional handover failure occurs twice.

Optionally, the connection failure type includes at least one of the following:

RUDI or DAPS fails;

the terminal falls back to normal handover after the RUDI or DAPS fails;

radio link failure (RLF) occurs once and conditional handover (CHO) failure occurs once;

handover failure occurs once and conditional handover failure occurs once;

the conditional handover failure occurs twice; or both the conditional handover and the RUDI/DAPS fail.

Optionally, the information of the failure related time difference includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

Optionally, the transceiver module is further configured to report measurement information of the cell measured until the connection failure occurs, wherein the cell includes at least one of the following: a source cell, a target cell where the terminal handover fails, and a candidate target cell configured on the network side device.

Optionally, the measurement information includes at least one of the following: a cell identifier; a cell measurement result; a beam ID measured by the terminal; a beam measurement result; or a quantity of beams whose beam quality exceeds a preconfigured threshold in a cell measured by the terminal.

Optionally, the transceiver module is further configured to report a handover event and/or threshold information related to the conditional handover failure.

Optionally, the network device is one of the following: a source base station or a source cell; a new base station or a new cell to which the terminal is connected; or a target base station or a target cell to which the terminal is handed over.

Optionally, the terminal reports the connection failure information to the network device through one of the following information:

a re-establishment request message; a radio link failure (RLF) report; minimized drive test information; or a re-establishment reason message.

An embodiment of the present disclosure further provides a network device, including:

a transceiver, configured to receive information of a connection failure or a secondary cell addition failure, the information of the connection failure or the secondary cell addition failure being reported by a terminal, wherein the connection failure includes at least one of the following: a reduction in user data interruption (RUDI) failure and a dual active protocol stack (DAPS) failure.

Optionally, the information includes at least one of the following:

information of a conditional handover; a connection failure type; or information of a failure related time difference.

Optionally, the connection failure further includes: a conditional handover failure;

the information of the conditional handover includes at least one of the following:

the conditional handover failure occurs; the conditional handover failure occurs for the first time; the conditional handover failure occurs once; the conditional handover failure occurs after a re-establishment or a cell selection; the second conditional handover fails after the re-establishment or the cell selection; the second conditional handover fails; or the conditional handover failure occurs twice.

Optionally, the connection failure type includes at least one of the following:

RUDI or DAPS fails;

the terminal falls back to normal handover after the RUDI or DAPS fails;

radio link failure (RLF) occurs once and conditional handover (CHO) failure occurs once;

handover failure occurs once and conditional handover failure occurs once;

the conditional handover failure occurs twice; or both the conditional handover and the RUDI/DAPS fail.

Optionally, the information of the failure related time difference includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

Optionally, the transceiver is further configured to receive measurement information of a cell measured until the connection failure occurs, the measurement information of the cell measured until the connection failure occurs being reported by the terminal, wherein the cell includes at least one of the following: a source cell, a target cell where the terminal handover fails, and a candidate target cell configured on the network side device.

Optionally, the measurement information includes at least one of the following: a cell identifier; a cell measurement result; a beam ID measured by the terminal; a beam measurement result; or a quantity of beams whose beam quality exceeds a preconfigured threshold in a cell measured by the terminal.

Optionally, the transceiver is further configured to receive a handover event and/or threshold information related to the conditional handover failure.

Optionally, the network device is one of the following: a source base station or a source cell; a new base station or a new cell to which the terminal is connected; or a target base station or a target cell to which the terminal is handed over.

Optionally, the transceiver is configured to receive the connection failure information reported by the terminal through one of the following information: a re-establishment request message; a radio link failure (RLF) report; minimized drive test information; or a re-establishment reason message.

An embodiment of the present disclosure further provides an information receiving apparatus, which is applied to a network device, and the apparatus includes:

a transceiver module, configured to receive information of a connection failure or a secondary cell addition failure, the information of the connection failure or the secondary cell addition failure being reported by a terminal, wherein the connection failure includes at least one of the following: a reduction in user data interruption (RUDI) failure and a dual active protocol stack (DAPS) failure.

Optionally, the information includes at least one of the following: information of a conditional handover; a connection failure type; or information of a failure related time difference.

Optionally, the connection failure further includes: a conditional handover failure;

the information of the conditional handover includes at least one of the following:

the conditional handover failure occurs; the conditional handover failure occurs for the first time; the conditional handover failure occurs once; the conditional handover failure occurs after a re-establishment or a cell selection; the second conditional handover fails after the re-establishment or the cell selection; the second conditional handover fails; or the conditional handover failure occurs twice.

Optionally, the connection failure type includes at least one of the following:

RUDI or DAPS fails;

the terminal falls back to normal handover after the RUDI or DAPS fails;

radio link failure (RLF) occurs once and conditional handover (CHO) failure occurs once;

handover failure occurs once and conditional handover failure occurs once;

the conditional handover failure occurs twice; or both the conditional handover and the RUDI/DAPS fail.

Optionally, the information of the failure related time difference includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

Optionally, the transceiver module is further configured to receive measurement information of a cell measured until the connection failure occurs, the measurement information of the cell measured until the connection failure occurs being reported by the terminal, wherein the cell includes at least one of the following: a source cell, a target cell where the terminal handover fails, and a candidate target cell configured on the network side device.

Optionally, the measurement information includes at least one of the following: a cell identifier; a cell measurement result; a beam ID measured by the terminal; a beam measurement result; or a quantity of beams whose beam quality exceeds a preconfigured threshold in a cell measured by the terminal.

Optionally, the transceiver module is further configured to receive a handover event and/or threshold information related to the conditional handover failure.

Optionally, the network device is one of the following: a source base station or a source cell; a new base station or a new cell to which the terminal is connected; or a target base station or a target cell to which the terminal is handed over.

Optionally, the transceiver module is configured to receive the connection failure information reported by the terminal through one of the following information: a re-establishment request message; a radio link failure (RLF) report; minimized drive test information; or a re-establishment reason message.

An embodiment of the present disclosure further provides a communication device, including: a processor, and a memory storing therein a computer program, wherein the computer program is configured to be executed by the processor to perform the above-mentioned methods.

An embodiment of the present disclosure further provides a computer-readable storage medium, including an instruction, wherein the instruction is configured to be executed by a computer to implement the above-mentioned methods.

The above-mentioned solution of the present disclosure has at least the following beneficial effects.

The above-mentioned solution of the present disclosure, through reporting, to a network device, information of a connection failure or a secondary cell addition failure, wherein the connection failure includes at least one of the following: a conditional handover failure, a reduction in user data interruption (RUDI) failure and a dual active protocol stack (DAPS) failure, enables the network device to make configurations properly according to the information reported by the terminal. Examples are as follows.

According to the information of the conditional handover reported by the UE, such as: the conditional handover failure occurs; the conditional handover failure occurs for the first time; the conditional handover failure occurs once; the conditional handover failure occurs after a re-establishment or a cell selection; the second conditional handover fails after the re-establishment or the cell selection; the second conditional handover fails; or the conditional handover failure occurs twice, the network side device can understand how many times the UE has failed, and can roughly infer whether the events and/or corresponding parameters configured for the conditional handover are proper, and then in conjunction with the measurement information of the cell measured until the failure occurs, the network side device can optimize the events and/or corresponding parameters configured for the subsequent conditional handover.

According to the connection failure type reported by the UE, such as RUDI or DAPS fails, and both the conditional handover and the RUDI/DAPS fail, the network side device can determine whether the parameter configuration of the conditional handover or the parameter configuration of the RUDI or DAPS handover needs to be optimized.

According to the information of the failure related time difference, such as the time difference between when the terminal receives the conditional handover configuration or the conditional handover configuration sent by the network device and when the connection failure occurs, the network side device can determine whether the conditional handover configuration information is sent in time. If the time difference is very short, it means that the configuration is sent too late; if the time difference is too long, it means that the configuration is sent too early, and resources such as dedicated random access resources of the candidate target cell on the network side are occupied for too long, and the subsequent configuration should be done later. According to the time difference between when the CHO failure occurs for the second time and when the radio link failure (RLF) report related signalling occurs, it can be inferred how long it took for the UE to restore the connection with the network side, which also indirectly indicates the wireless coverage, and if the time difference is too long, it indicates that it is difficult for the UE to find the network, and the coverage needs to be optimized. According to the time difference between when the RUDI or DAPS starts and when the RUDI/DAPS fails or the terminal falls back to the normal handover, the network side device can determine whether the timing of the RUDI or DAPS configuration is appropriate, and can subsequently make adjustments to advance or postpone the configuration.

BRIEF DESCRIPTION OF THE DRAWINGS

FIG. 1 is a schematic flowchart of an information reporting method according to an embodiment of the present disclosure;

FIG. 2 is a schematic flowchart of a condition handover according to an embodiment of the present disclosure;

FIG. 3 is a schematic flowchart of an information receiving method according to an embodiment of the present disclosure;

DETAILED DESCRIPTION

Figure 4:
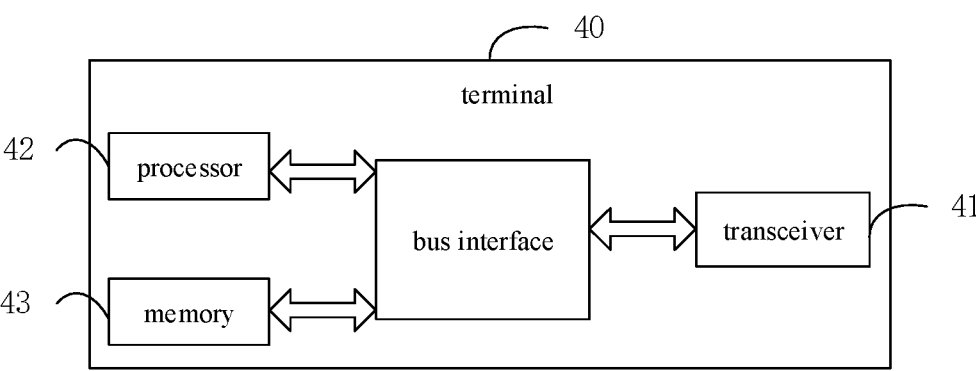
FIG. 4 is a schematic structural diagram of a terminal according to an embodiment of the present disclosure.

The exemplary embodiments of the present disclosure will be described in more detail below with reference to the accompanying drawings. While the exemplary embodiments of the present disclosure are shown in the drawings, it should be understood that the present disclosure may be implemented in various forms and should not be limited by the embodiments set forth herein. Rather, these embodiments are provided so that the present disclosure will be more thoroughly understood, and will fully convey the scope of the present disclosure to those skilled in the art.

As shown in FIG. 1, an information reporting method is applied to a terminal, and the method includes: Step 11: reporting, to a network device, information of a connection failure or a secondary cell (PScell) addition failure, wherein the connection failure includes at least one of the following: a conditional handover failure, a reduction in user data interruption (RUDI) failure and a dual active protocol stack (DAPS) failure.

The embodiment of the present disclosure, through reporting, to a network device, information of a connection failure or a secondary cell addition failure, wherein the connection failure includes at least one of the following: a conditional handover failure, a reduction in user data interruption (RUDI) failure and a dual active protocol stack (DAPS) failure, enables the network device to make configurations properly according to the information reported by the terminal.

In an optional embodiment of the present disclosure, the information includes at least one of the following: information of a conditional handover; a connection failure type; or information of a failure related time difference.

The information of the conditional handover includes at least one of the following: the conditional handover failure occurs; the conditional handover failure occurs for the first time; the conditional handover failure occurs once; the conditional handover failure occurs after a re-establishment or a cell selection; a second conditional handover fails after a re-establishment or a cell selection; the second conditional handover fails; or the conditional handover failure occurs twice.

The connection failure type includes at least one of the following: RUDI or DAPS fails; the terminal falls back to a normal handover after the RUDI or DAPS fails; radio link failure (RLF) occurs once and conditional handover (CHO) failure occurs once; handover failure occurs once and conditional handover failure occurs once; the conditional handover failure occurs twice; or both the conditional handover and the RUDI/DAPS fail.

The failure related time difference information includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

In the embodiment of the present disclosure, the second conditional handover refers to the conditional handover performed after the terminal performs re-establishment or cell selection after RLF or handover failure (HOF) or conditional handover (CHO) failure.

In an optional embodiment of the present disclosure, based on the above-mentioned step 11, the information reporting method may further include:

Step 12: reporting the measurement information of the cell measured until the connection failure occurs, wherein the cell includes at least one of the following: a source cell, a target cell where the terminal handover fails, and a candidate target cell configured on the network side.

The measurement information includes at least one of the following: a cell identifier; a cell measurement result; a beam identifier (ID) measured by the terminal; a beam measurement result; or the quantity of beams whose beam quality exceeds a preconfigured threshold in the cell, e.g., the quantity of beams whose reference signal received power (RSRP) exceeds a preconfigured threshold or whose reference signal received quality (RSRQ) exceeds a certain threshold.

In an optional embodiment of the present disclosure, based on the above-mentioned step 11, the information reporting method may further include: reporting a handover event and/or threshold information related to the conditional handover failure.

Optionally, the network device is one of the following: a source base station or a source cell; a new base station or a new cell to which the terminal is connected; or a target base station or a target cell to which the terminal is handed over.

Optionally, the terminal reports the connection failure information to the network device through one of the following information: a re-establishment request message; a radio link failure (RLF) report; minimized drive test information; or a re-establishment reason message. The minimized drive test (MDT) information can include two types: logged MDT and immediate MDT.

In the above-mentioned embodiment of the present disclosure, the terminal performs cell selection after handover or conditional handover, and if the selected cell is a conditional handover (CHO) candidate target cell, CHO is performed, and if this CHO fails, it is a conditional handover failure after a re-establishment or cell selection.

In the above-mentioned embodiment of the present disclosure, the type of connection failure experienced by the UE includes: e.g., radio link failure (RLF) occurs once+ conditional handover (CHO) failure occurs once, or handover failure (HOF) occurs once+conditional handover (CHO) failure occurs once, or conditional handover (CHO) failure occurs twice.

In the above-mentioned embodiment of the present disclosure, if the RUDI/DAPS fails, the UE may report that it has fallen back to a normal handover, which may replace the foregoing RUDI/DAPS failure report, or the UE may not only report that it has fallen back to a normal handover, but also perform the foregoing RUDI/DAPS failure report.

In the above-mentioned embodiment of the present disclosure, if CHO fails, the terminal initiates re-establishment and may connect to a new base station or a new cell; if RUDI/DAPS fails, the UE falls back to a normal handover and connects to the target cell. The flowchart of conditional handover is as shown in FIG. 2.

In the above-mentioned embodiment of the present disclosure, new re-establishment reasons are introduced into the reestablishmentCause, such as conditional handover failure occurs or conditional handover failure occurs for the first time or conditional handover failure occurs once, conditional handover failure occurs after re-establishment or cell selection, or the second conditional handover fails, or the conditional handover failure occurs twice; the type of failure experienced by the terminal includes: RLF occurs once+CHO failure occurs once, or HOF occurs once+CHO failure occurs once, or CHO failure occurs twice, or RUDI/ DAPS failure occurs.

In the above-mentioned embodiment of the present disclosure, the terminal records or reports conditional handover, secondary cell addition failure, RUDI/DAPS failure, and related measurement information, which can help the network side device to configure proper parameters related to the conditional handover, secondary cell addition, and RUDI/DAPS.

As shown in FIG. 3, an embodiment of the present disclosure further provides an information receiving method, which is applied to a network device, and the method includes:

Step 31: receiving information of a connection failure or a secondary cell addition failure, the information of the connection failure or the secondary cell addition failure being reported by a terminal, wherein the connection failure includes at least one of the following: a conditional handover failure, a reduction in user data interruption (RUDI) failure and a dual active protocol stack (DAPS) failure.

In an optional embodiment of the present disclosure, the information includes at least one of the following: information of a conditional handover; a connection failure type; or information of a failure related time difference.

In an optional embodiment of the present disclosure, the information of the conditional handover includes at least one of the following:

the conditional handover failure occurs; the conditional handover failure occurs for the first time; the conditional handover failure occurs once; the conditional handover failure occurs after a re-establishment or a cell selection; the second conditional handover fails after a re-establishment or a cell selection; the second conditional handover fails; or the conditional handover failure occurs twice.

In an optional embodiment of the present disclosure, the connection failure type includes at least one of the following: RUDI or DAPS fails; the terminal falls back to a normal handover after the RUDI or DAPS fails; radio link failure (RLF) occurs once and conditional handover (CHO) failure occurs once; handover failure occurs once and conditional handover failure occurs once; the conditional handover failure occurs twice; or both the conditional handover and the RUDI/DAPS fail.

In an optional embodiment of the present disclosure, the information of the failure related time difference includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

In an optional embodiment of the present disclosure, the information receiving method further includes: receiving measurement information of a cell measured until the connection failure occurs, the measurement information of the cell measured until the connection failure occurs being reported by the terminal, wherein the cell includes at least one of the following: a source cell, a target cell where the terminal handover fails, and a candidate target cell configured on the network side device.

In an optional embodiment of the present disclosure, the measurement information includes at least one of the following: a cell identifier; a cell measurement result; a beam ID measured by the terminal; a beam measurement result; or the quantity of beams whose beam quality exceeds a preconfigured threshold in a cell measured by the terminal.

In an optional embodiment of the present disclosure, the information receiving method further includes: receiving a handover event and/or threshold information related to the conditional handover failure.

In an optional embodiment of the present disclosure, the network device is one of the following: a source base station or a source cell; a new base station or a new cell to which the terminal is connected; and a target base station or a target cell to which the terminal is handed over.

In an optional embodiment of the present disclosure, the network device receives the connection failure information reported by the terminal through one of the following information: a re-establishment request message; a radio link failure (RLF) report; minimized drive test information; or a re-establishment reason message.

In an optional embodiment of the present disclosure, the information receiving method further includes: according to the received information of the connection failure or the secondary cell addition failure, configuring the related parameters of conditional handover, secondary cell addition, and RUDI/DAPS, thereby reducing connection failure rate.

As shown in FIG. 4, an embodiment of the present disclosure further provides a terminal 40, including:

a transceiver 41, configured to report, to a network device, information of a connection failure or a secondary cell addition failure, wherein the connection failure includes at least one of the following: a conditional handover failure, a reduction in user data interruption (RUDI) failure and a dual active protocol stack (DAPS) failure.

In an optional embodiment of the present disclosure, the information includes at least one of the following: information of a conditional handover; a connection failure type; or information of a failure related time difference.

In an optional embodiment of the present disclosure, the information of the conditional handover includes at least one of the following:

the conditional handover failure occurs; the conditional handover failure occurs for the first time; the conditional handover failure occurs once; the conditional handover failure occurs after a re-establishment or a cell selection; the second conditional handover fails after a re-establishment or a cell selection; the second conditional handover fails; or the conditional handover failure occurs twice.

In an optional embodiment of the present disclosure, the connection failure type includes at least one of the following:

RUDI or DAPS fails;

the terminal falls back to a normal handover after the RUDI or DAPS fails;

radio link failure (RLF) occurs once and conditional handover (CHO) failure occurs once;

handover failure occurs once and conditional handover failure occurs once;

the conditional handover failure occurs twice; or both the conditional handover and the RUDI/DAPS fail.

In an optional embodiment of the present disclosure, the failure related time difference information includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

In an optional embodiment of the present disclosure, the information reporting method further includes: reporting measurement information of a cell measured until the connection failure occurs, wherein the cell includes at least one of the following: a source cell, a target cell where the terminal handover fails, and a candidate target cell configured on the network side.

In an optional embodiment of the present disclosure, the measurement information includes at least one of the following: a cell identifier; a cell measurement result; a beam ID measured by the terminal; a beam measurement result; or the quantity of beams whose beam quality exceeds a preconfigured threshold in the cell measured by the terminal.

In an optional embodiment of the present disclosure, the information reporting method further includes: reporting a handover event and/or threshold information related to the conditional handover failure.

In an optional embodiment of the present disclosure, the network device is one of the following: a source base station or a source cell; a new base station or a new cell to which the terminal is connected; or a target base station or a target cell to which the terminal is handed over.

In an optional embodiment of the present disclosure, the terminal reports the connection failure information to the network device through one of the following information:

a re-establishment request message; a radio link failure (RLF) report; minimized drive test information; or a re-establishment reason message.

It should be noted that the terminal is a terminal corresponding to the above-mentioned method shown in FIG. 1, and all implementations in the above method embodiments are applicable to the embodiments of the terminal, and the same technical effects can also be achieved. The terminal may further include: a memory 43; the transceiver 41 and a processor 42 may be connected through a bus interface, and the transceiver 41 and the memory 43 may be connected through the bus interface, the functions of the transceiver 41 may be implemented by the processor 42, and the functions of the processor 42 may also be implemented by the transceiver 41.

Figure 5:
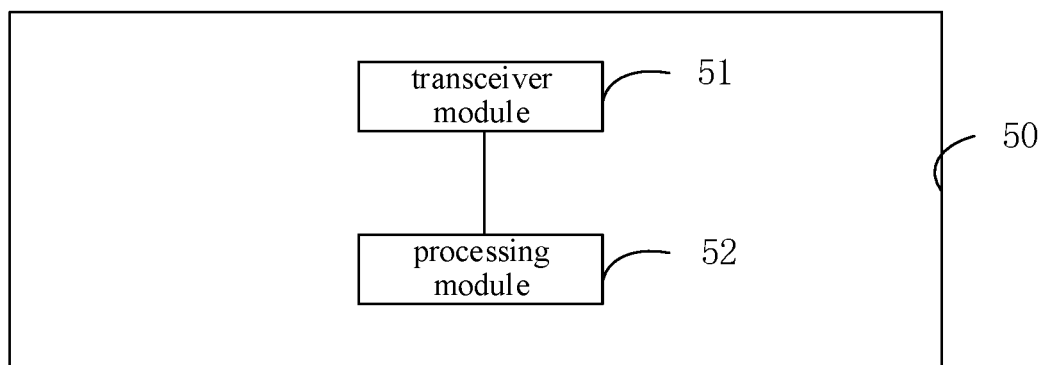
FIG. 5 is a block diagram of an information reporting apparatus according to an embodiment of the present disclosure.

As shown in FIG. 5, an embodiment of the present disclosure further provides an information reporting apparatus 50, which is applied to a terminal, and the apparatus includes:

a transceiver module 51, configured to report, to a network device, information of a connection failure or a secondary cell addition failure, wherein the connection failure includes at least one of the following: a conditional handover failure, a reduction in user data interruption (RUDI) failure and a dual active protocol stack (DAPS) failure.

In an optional embodiment of the present disclosure, the information includes at least one of the following: information of a conditional handover; a connection failure type; or information of a failure related time difference.

In an optional embodiment of the present disclosure, the information of the conditional handover includes at least one of the following: the conditional handover failure occurs; the conditional handover failure occurs for the first time; the conditional handover failure occurs once; the conditional handover failure occurs after a re-establishment or a cell selection; the second conditional handover fails after the re-establishment or the cell selection; the second conditional handover fails; or the conditional handover failure occurs twice.

In an optional embodiment of the present disclosure, the connection failure type includes at least one of the following:

RUDI or DAPS fails;

the terminal falls back to a normal handover after the RUDI or DAPS fails;

radio link failure (RLF) occurs once and conditional handover (CHO) failure occurs once;

handover failure occurs once and conditional handover failure occurs once;

the conditional handover failure occurs twice; or both the conditional handover and the RUDI/DAPS fail.

In an optional embodiment of the present disclosure, the information of the failure related time difference includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

In an optional embodiment of the present disclosure, the transceiver module is further configured to report measurement information of the cell measured until the connection failure occurs, wherein the cell includes at least one of the following: a source cell, a target cell where the terminal handover fails, and a candidate target cell configured on the network side device.

In an optional embodiment of the present disclosure, the measurement information includes at least one of the following: a cell identifier; a cell measurement result; a beam ID measured by the terminal; a beam measurement result; or the quantity of beams whose beam quality exceeds a pre-configured threshold in a cell measured by the terminal.

In an optional embodiment of the present disclosure, the transceiver module is further configured to report a handover event and/or threshold information related to the conditional handover failure.

In an optional embodiment of the present disclosure, the network device is one of the following: a source base station or a source cell; a new base station or a new cell to which the terminal is connected; and a target base station or a target cell to which the terminal is handed over.

In an optional embodiment of the present disclosure, the terminal reports the connection failure information to the network device through one of the following information:

a re-establishment request message; a radio link failure (RLF) report; minimized drive test information; or a re-establishment reason message.

It should be noted that the apparatus is an apparatus corresponding to the above-mentioned method shown in FIG. 1, and all implementations in the above method embodiments are applicable to the embodiments of the apparatus, and the same technical effects can also be achieved. The apparatus may further include a processing module 52 for processing the information sent and received by the transceiver module 51, etc.

Figure 6:
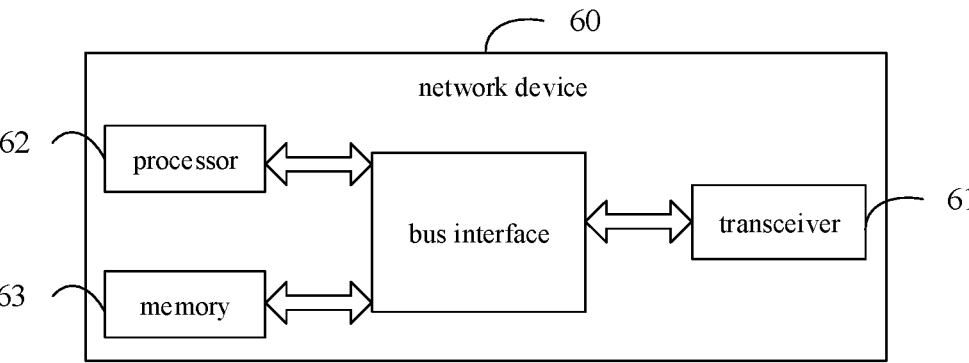
FIG. 6 is a schematic structural diagram of a network device according to an embodiment of the present disclosure.

As shown in FIG. 6, an embodiment of the present disclosure further provides a network device 60, including:

a transceiver 61, configured to receive information of a connection failure or a secondary cell addition failure, the information of the connection failure or the secondary cell addition failure being reported by a terminal, wherein the connection failure includes at least one of the following: a conditional handover failure, a reduction in user data interruption (RUDI) failure and a dual active protocol stack (DAPS) failure.

In an optional embodiment of the present disclosure, the information includes at least one of the following: information of a conditional handover; a connection failure type; or information of a failure related time difference.

In an optional embodiment of the present disclosure, the information of the conditional handover includes at least one of the following:

the conditional handover failure occurs; the conditional handover failure occurs for the first time; the conditional handover failure occurs once; the conditional handover failure occurs after a re-establishment or a cell selection; the second conditional handover fails after the re-establishment or the cell selection; the second conditional handover fails; or the conditional handover failure occurs twice.

In an optional embodiment of the present disclosure, the connection failure type includes at least one of the following:

RUDI or DAPS fails;

the terminal falls back to normal handover after the RUDI or DAPS fails;

radio link failure (RLF) occurs once and conditional handover (CHO) failure occurs once;

handover failure occurs once and conditional handover failure occurs once;

the conditional handover failure occurs twice; or both the conditional handover and the RUDI/DAPS fail.

In an optional embodiment of the present disclosure, the information of the failure related time difference includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

In an optional embodiment of the present disclosure, transceiver 61 is further configured to receive measurement information of a cell measured until the connection failure occurs, the measurement information of the cell measured until the connection failure occurs being reported by the terminal, wherein the cell includes at least one of the following: a source cell, a target cell where the terminal handover fails, and a candidate target cell configured on the network side device.

In an optional embodiment of the present disclosure, the measurement information includes at least one of the following: a cell identifier; a cell measurement result; a beam ID measured by the terminal; a beam measurement result; or the quantity of beams whose beam quality exceeds a pre-configured threshold in a cell measured by the terminal.

In an optional embodiment of the present disclosure, the transceiver 61 is further configured to receive a handover event and/or threshold information related to the conditional handover failure.

In an optional embodiment of the present disclosure, the network device is one of the following: a source base station or a source cell; a new base station or a new cell to which the terminal is connected; or a target base station or a target cell to which the terminal is handed over.

In an optional embodiment of the present disclosure, the transceiver 61 is configured to receive the connection failure information reported by the terminal through one of the following information: a re-establishment request message; a radio link failure (RLF) report; minimized drive test information; or a re-establishment reason message.

It should be noted that the network device is a network device corresponding to the above-mentioned method shown in FIG. 3, and all implementations in the above method embodiments are applicable to the embodiments of the network device, and the same technical effects can also be achieved. The network device may further include: a memory 63; the transceiver 61 and a processor 62 may be connected through a bus interface, and the transceiver 61 and the memory 63 may be connected through the bus interface, and the functions of the transceiver 61 may be implemented by the processor 62, and the functions of the processor 62 may also be implemented by the transceiver 61.

Figure 7:
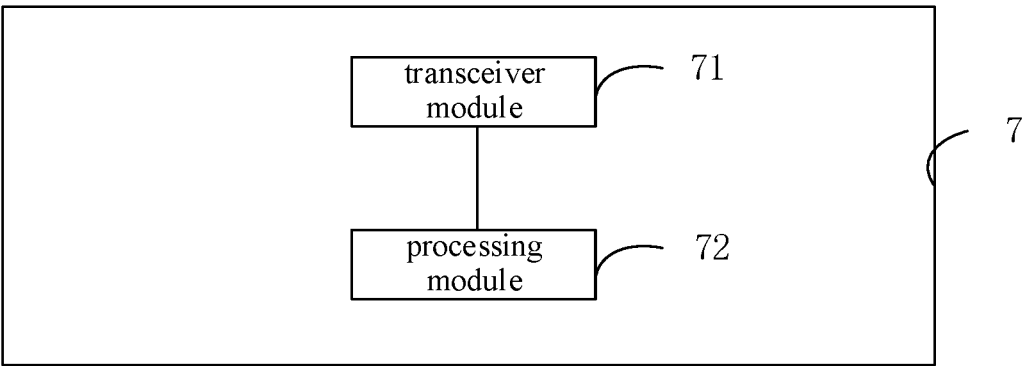
FIG. 7 is a block diagram of an information receiving apparatus according to an embodiment of the present disclosure.

As shown in FIG. 7, an embodiment of the present disclosure further provides an information receiving apparatus 70, which is applied to a network device and the apparatus includes:

a transceiver module 71, configured to receive information of a connection failure or a secondary cell addition failure, the information of the connection failure or the secondary cell addition failure being reported by a terminal, wherein the connection failure includes at least one of the following: a conditional handover failure, a reduction in user data interruption (RUDI) failure and a dual active protocol stack (DAPS) failure.

In an optional embodiment of the present disclosure, the information includes at least one of the following: information of a conditional handover; a connection failure type; or information of a failure related time difference.

In an optional embodiment of the present disclosure, the information of the conditional handover includes at least one of the following:

the conditional handover failure occurs; the conditional handover failure occurs for the first time; the conditional handover failure occurs once; the conditional handover failure occurs after a re-establishment or a cell selection; the second conditional handover fails after the re-establishment or the cell selection; the second conditional handover fails; or the conditional handover failure occurs twice.

In an optional embodiment of the present disclosure, the connection failure type includes at least one of the following:

RUDI or DAPS fails;

the terminal falls back to a normal handover after the RUDI or DAPS fails;

radio link failure (RLF) occurs once and conditional handover (CHO) failure occurs once;

handover failure occurs once and conditional handover failure occurs once;

the conditional handover failure occurs twice; or both the conditional handover and the RUDI/DAPS fail.

In an optional embodiment of the present disclosure, the information of the failure related time difference includes at least one of the following:

a time difference between when the terminal receives a normal handover command or a handover starts and when the second conditional handover fails;

a time difference between when the terminal receives the normal handover command or the handover starts and when a connection failure occurs;

a time difference between when the terminal receives a conditional handover configuration or a conditional handover configuration sent by the network device and when the second conditional handover fails;

a time difference between when the terminal receives the conditional handover configuration or the conditional handover configuration sent by the network device and when the connection failure occurs;

a time difference between when the terminal experiences radio link failure (RLF) or handover failure (HOF) or conditional handover (CHO) failure for the first time and when the second CHO fails;

a time difference between when the second CHO fails and when a radio link failure (RLF) report related signalling is sent;

a time difference between when the RUDI/DAPS starts and when a failure in a source cell occurs or the terminal falls back to a normal handover; or a time difference between when the RUDI/DAPS fails or the terminal falls back to the normal handover and when the radio link failure (RLF) report related signalling occurs.

In an optional embodiment of the present disclosure, the transceiver module is further configured to receive measurement information of a cell measured until the connection failure occurs, the measurement information of the cell measured until the connection failure occurs being reported by the terminal, wherein the cell includes at least one of the following: a source cell, a target cell where the terminal handover fails, and a candidate target cell configured on the network side device.

In an optional embodiment of the present disclosure, the measurement information includes at least one of the following: a cell identifier; a cell measurement result; a beam ID measured by the terminal; a beam measurement result; or the quantity of beams whose beam quality exceeds a preconfigured threshold in a cell measured by the terminal.

In an optional embodiment of the present disclosure, the transceiver module is further configured to receive a handover event and/or threshold information related to the conditional handover failure.

In an optional embodiment of the present disclosure, the network device is one of the following: a source base station or a source cell; a new base station or a new cell to which the terminal is connected; or a target base station or a target cell to which the terminal is handed over.

In an optional embodiment of the present disclosure, the transceiver module is configured to receive the connection failure information reported by the terminal through one of the following information: a re-establishment request message; a radio link failure (RLF) report; minimized drive test information; or a re-establishment reason message.

It should be noted that the apparatus is an apparatus corresponding to the above-mentioned method shown in FIG. 3, and all implementations in the above method embodiments are applicable to the embodiments of the apparatus, and the same technical effects can be achieved, and the apparatus may further include a processing module 72 for processing the information sent and received by the transceiver module 71, etc.

An embodiment of the present disclosure further provides a communication device, including: a processor and a memory storing therein a computer program, wherein the computer program is configured to be executed by the processor to perform the method described with respect to FIG. 1 or FIG. 3. All implementation manners in the foregoing method embodiments are applicable to this embodiment, and the same technical effect can also be achieved.

An embodiment of the present disclosure further provides a computer-readable storage medium, including an instruction, wherein the instruction is configured to be executed by a computer to implement the method described with respect to FIG. 1 or FIG. 3 above. All implementation manners in the foregoing method embodiments are applicable to this embodiment, and the same technical effect can also be achieved.

The person skilled in the art may realize that the units and algorithm steps described in the embodiments disclosed herein can be implemented by electronic hardware or a combination of computer software and electronic hardware. Whether these functions are executed by hardware or software depends on the specific application and design constraint conditions of the technical solution. The person skilled in the art can use different methods for each specific application to implement the described functions, but such implementation should not be considered as going beyond the scope of the present disclosure.

The person skilled in the art can clearly understand that, for convenience and conciseness of description, for the specific working process of the system, device, and unit described above, reference may be made to the corresponding process in the above-mentioned method embodiments, which is not repeated here.

In the embodiments provided in the present disclosure, it should be understood that the disclosed device and method may be implemented in other ways. For example, the device embodiments described above are only illustrative, for example, the division of the units is only a logical function division, and there may be other type of divisions in actual implementation, for example, multiple units or components may be combined or it can be integrated into another system, or some features can be ignored or not implemented. In addition, the displayed or discussed mutual coupling or direct coupling or communication connection may be indirect coupling or communication connection through some interfaces, devices, or units, and maybe in electrical, mechanical, or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on such an understanding, essential parts, or parts contributing to the related art, of the technical solution of the present disclosure may be implemented in a form of a software product. The computer software product is stored in a storage medium and includes several instructions to make a computer device (which may be a personal computer, a server, or a network device, etc.) to execute all or part of the steps of the methods described in the various embodiments of the present disclosure. The aforementioned storage media include: U disk, mobile hard disk, read-only memory (ROM), random access memory (RAM), magnetic disk or optical disc, and other media that can store program codes.

In addition, it should be pointed out that in the device and method of the present disclosure, obviously, each component or each step can be decomposed and/or recombined. This decomposition and/or recombination should be regarded as equivalent solutions of the present disclosure. In addition, steps for performing the above series of processing can naturally be performed in a chronological order in description, but do not necessarily need to be performed in the chronological order, and some steps can be performed in parallel or independently of each other. The person skilled in the art can understand that all or any of the steps or components of the method and device of the present disclosure can be implemented by hardware, firmware, software, or any combination thereof in any computing device (including a processor, storage medium, etc.) or a network of computing devices. This can be achieved by the person skilled in the art using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be achieved by only providing a program product containing program code for implementing the method or device of the present disclosure. That is, such a program product also constitutes the present disclosure, and a storage medium storing such a program product also constitutes the present disclosure. Obviously, the storage medium may be any well-known storage medium, or any storage medium developed in the future. It should also be pointed out that in the device and method of the present disclosure, obviously, each component or each step can be decomposed and/or recombined. This decomposition and/or recombination should be regarded as equivalent solutions of the present disclosure. In addition, the steps for executing the above-mentioned series of processing can naturally be executed in a chronological order in the description, but it is not necessarily executed in the chronological order. Some steps can be performed in parallel or independently of each other.

It can be understood that the embodiments described in the present disclosure may be implemented by hardware, software, firmware, middleware, microcode, or a combination thereof. For hardware implementation, a unit, module, subunit and submodule can be implemented in one or more application-specific integrated circuits (ASIC), digital signal processor (DSP), digital signal processing device (DSP Device, DSPD), programmable logic device (PLD), field-programmable gate array (FPGA), general-purpose processors, controllers, microcontrollers, microprocessors, other electronic units for performing the functions described in this disclosure or a combination thereof.

For a software implementation, the technology described in the embodiments of the present disclosure can be implemented by modules (for example, processes, functions, etc.) that perform the described functions of the embodiments of the present disclosure. The software codes can be stored in a memory and executed by a processor. The memory can be implemented in the processor or external to the processor.

The above are optional implementations of the present disclosure. It should be pointed out that a person skilled in the art can make several improvements and modifications without departing from the principle of the present disclosure. These improvements and modifications should also fall within the scope of the present disclosure.

What is claimed is:

1. An information reporting method, performed hv a terminal, comprising:

reporting, to a network device, information of a connection failure, wherein the connection failure comprises at least one of the following: a reduction in user data interruption (RUDI) failure and a dual active protocol stack (DAPS) failure;

wherein the information comprises: information of an RUDI failure related time difference, or information of a DAPS failure related time difference;

wherein the information of the RUDI failure related time difference comprises a time difference between when the RUDI starts and when a failure with respect to a source cell alone occurs, or the information of the DAPS failure related time difference comprises a time difference between when the DAPS starts and when a failure with respect to the source cell alone occurs.

2. The information reporting method according to claim 1, wherein the network device is one of the following:

a source base station or a source cell;

a new base station or a new cell to which the terminal is connected; or a target base station or a target cell to which the terminal is handed over.

3. The information reporting method according to claim 1, wherein the terminal reports the connection failure information to the network device through one of the following information:

a re-establishment request message;

a radio link failure (RLF) report;

minimized drive test information; or a re-establishment reason message.

4. A non-transitory computer-readable storage medium, comprising an instruction, wherein the instruction is configured to be executed by a computer to implement the method according to claim 1.

5. An information receiving method, performed by a network device, comprising:

receiving information of a connection failure, the information of the connection failure being reported by a terminal, wherein the connection failure comprises at least one of the following: a reduction in user data interruption (RUDI) failure and a dual active protocol stack (DAPS) failure;

wherein the information comprises: information of an RUDI failure related time difference, or information of a DAPS failure related time difference;

wherein the information of the RUDI failure related time difference comprises a time difference between when the RUDI starts and when a failure with respect to a source cell alone occurs, or the information of the DAPS failure related time difference comprises a time difference between when the DAPS starts and when a failure with respect to the source cell alone occurs.

6. A communication device, comprising a processor, and a memory storing therein a computer program, wherein the computer program is configured to be executed by the processor to implement the method according to claim 5.

7. A non-transitory computer-readable storage medium, comprising an instruction, wherein the instruction is configured to be executed by a computer to implement the method according to claim 5.

8. A communication device, comprising a processor, and a memory storing therein a computer program, wherein the computer program is configured to be executed by the processor to implement following step:

reporting, to a network device, information of a connection failure, wherein the connection failure comprises at least one of the following: a reduction in user data interruption (RUDI) failure and a dual active protocol stack (DAPS) failure;

wherein the information comprises: information of an RUDI failure related time difference, or information of a DAPS failure related time difference;

wherein the information of the RUDI failure related time difference comprises a time difference between when the RUDI starts and when a failure with respect to a source cell alone occurs, or the information of the DAPS failure related time difference comprises a time difference between when the DAPS starts and when a failure with respect to the source cell alone occurs.

\* \* \* \* \*